Feb. 9, 1954   J. W. JACOBS ET AL   2,668,436
TESTING APPARATUS FOR THERMOSTATIC SWITCHES
Filed Dec. 6, 1950   3 Sheets-Sheet 1

INVENTOR.
JAMES W. JACOBS
AND
BY ALBERT O. GROOMS.
Willits, Hardman and Fehr.
THEIR ATTORNEYS

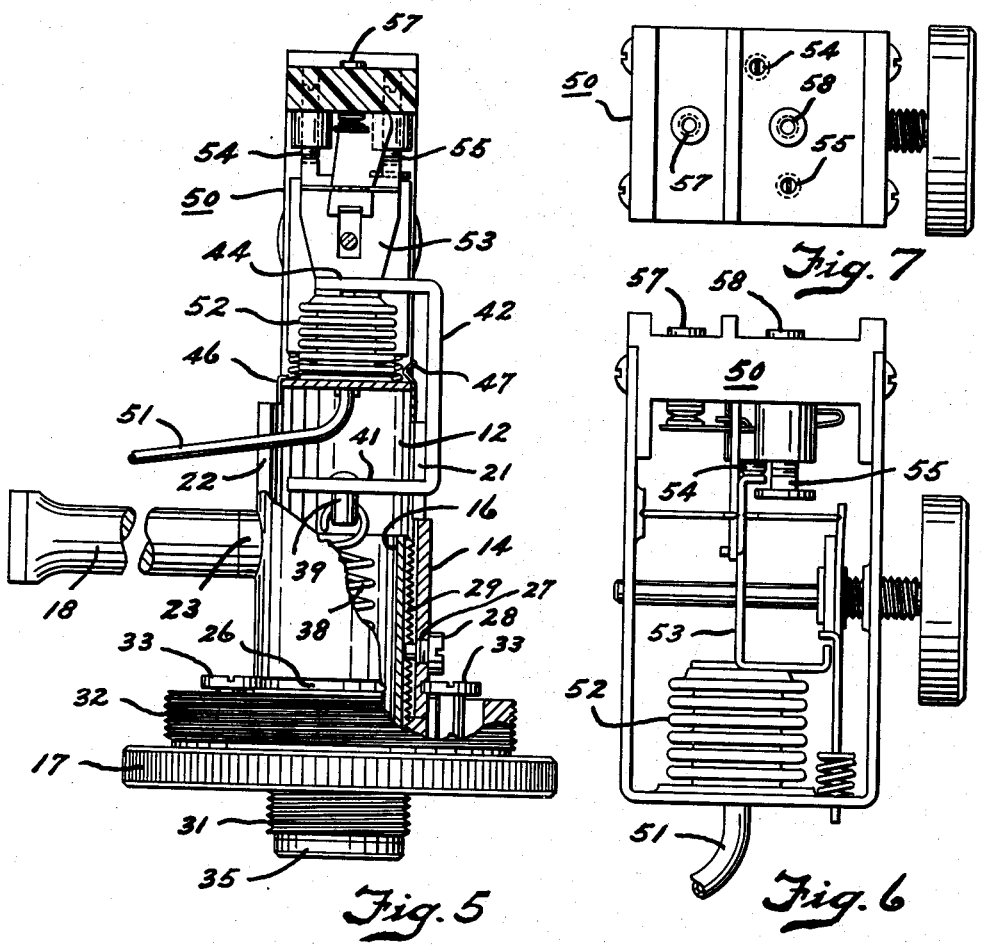

Feb. 9, 1954   J. W. JACOBS ET AL   2,668,436
TESTING APPARATUS FOR THERMOSTATIC SWITCHES
Filed Dec. 6, 1950   3 Sheets-Sheet 3
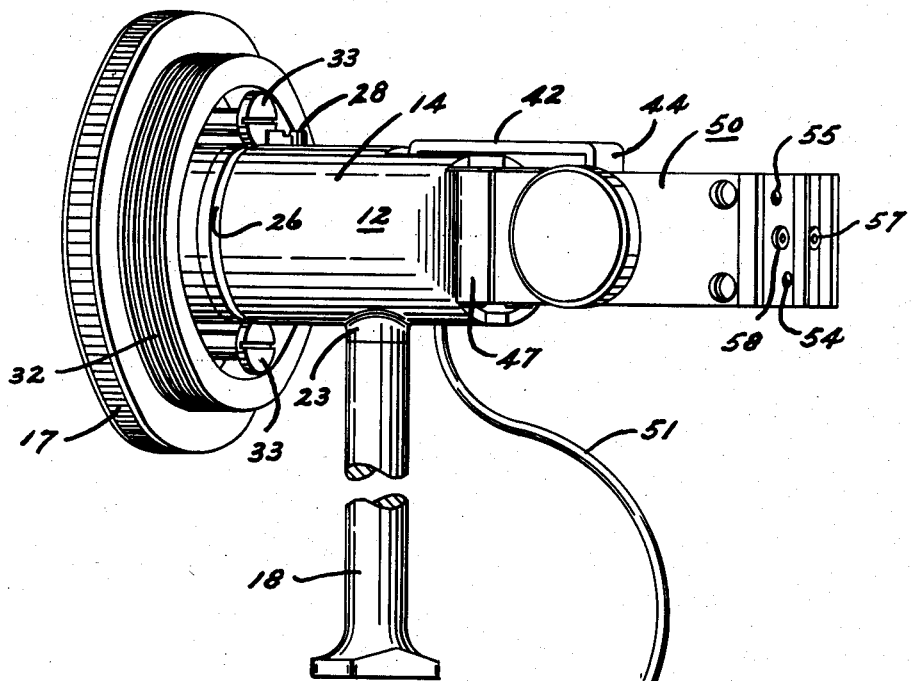
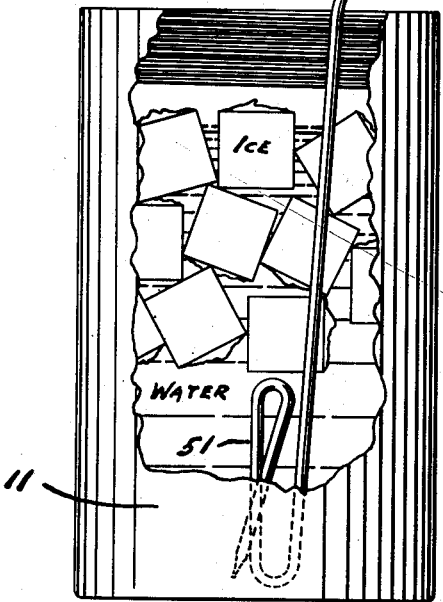
Fig. 9.
INVENTOR.
JAMES W. JACOBS
AND
BY ALBERT O. GROOMS.
Willits, Hardman & Fehr.
THEIR ATTORNEYS Patented Feb. 9, 1954

2,668,436

UNITED STATES PATENT OFFICE 2,668,436

TESTING APPARATUS FOR THERMOSTATIC SWITCHES

James W. Jacobs and Albert O. Grooms, Dayton, Ohio, assignors to General Motors Corporation, Dayton, Ohio, a corporation of Delaware Application December 6, 1950, Serial No. 199,542

4 Claims. (Cl. 73—1)

This invention relates to an apparatus for testing thermostatic switches having a thermo-sensitive and deflectable pressure element.

We are aware of the fact that apparatuses have been designed for calibrating, setting and testing adjustable thermostatic switches particularly of the type employed in refrigerating systems associated with household refrigerators at the factory and in service stations. These apparatuses are large, heavy, complicated and expensive and require a serviceman in the field to remove a switch from a refrigerator and return the switch to the service station in order to check, test and adjust the same. In addition, such apparatuses and the method performed thereon or therein are not entirely satisfactory for the reason that they require great skill in the techinque of control of the equipment, errors in instrumentation and interpretation of the instruments or apparatuses. We therefore desire to provide an apparatus for testing, checking and setting adjustable thermostatic switches in the field or in the home of a user of a refrigerator by servicemen which is simpler, accurate and which can be carried out with less skill than heretofore required. We contemplate the provision of an apparatus which will be light in weight so as to be portable to form a part of the equipment usually carried in a serviceman's kit or satchel and operable or rendered effective at the point of service or in the home of a user of a refrigerator.

An object of our invention is to provide an improved apparatus for testing and setting thermostatic switches having thermo-sensitive and deflectable elements which apparatus is simple and of low manufacturing cost.

Another object of our invention is to provide an apparatus for testing and setting thermostatic type switches having thermo-sensitive and deflectable elements which is small, compact, and of such light weight that it may be included as an element or instrument of a serviceman's repair or tool equipment usually carried in a kit or satchel.

Another object of our invention is to provide such an apparatus as described in the preceding objects wherein a calibrated spring is employed to apply force to the deflectable element of a switch being tested and wherein a scale or similar means is incorporated in or on the apparatus for indicating, particularly in degrees of temperature, the force created by the spring.

A further object of our invention is to provide an apparatus for testing and setting thermostatic switches which includes two removably secured together parts wherein one part thereof receives, protects and conceals portions of the other part and wherein the one part when detached or removed from the other part forms or serves as a receptacle to receive a body of liquid in which the thermo-sensitive portion of the element of a switch being tested is disposed during carrying out of the testing operation.

A still further and more specific object of our invention is to provide an apparatus for testing and setting thermostatic switches wherein a device of the apparatus includes portions movable longitudinally relative to one another by rotating part of one of the portions for varying the force applied by a spring in the device to the pressure element of the thermo-sensitive portion of a switch and wherein the rotatable part registers with a scale to indicate the spring force in degrees of temperature.

Advantages of our invention will become apparent from the following description reference being had to the accompanying drawings wherein one form of the present invention is shown.

In the drawings:

Fig. 4 is another horizontal sectional view taken on the line 4—4 of Fig. 2;

Fig. 5 is a view partly in section of a device part of the apparatus having a thermostatic switch removably clamped thereto;

Fig. 6 is a side view of a switch having incorporated therein a thermo-sensitive and pressure element;

Fig. 7 is a top view of the switch shown in Fig. 6 disclosing adjusting means employed to set a means movable by the thermo-sensitive and pressure element of the switch;

Fig. 8 is a fragmentary enlarged view showing a scale of an indicating means on one portion of the apparatus; and Fig. 9 is a perspective view with the parts of the apparatus separated and readied to carry out the act of testing switches.

The thermo-sensitive portion of a pressure element of a thermostatically operated switch of a refrigerating system associated with present day household refrigerator cabinets is secured in intimate thermal contact with the evaporator of the refrigerating system employed to cool the refrigerator. The evaporator of substantially all household refrigerators is maintained at a temperature below freezing and the cut-in and cut-out settings of a thermostatically operated switch associated with a refrigerator are approximately 28° F. and 12° F. respectively. Since most service calls relating to food storage compartment and consequently evaporator temperatures of household refrigerators require only minor adjustments of the thermostatic switch associated with the refrigerator there is ordinarily a plurality of ice blocks or cubes, in trays within the evaporator, available for use by a serviceman. It is well known that a spring can be calibrated and may have its calibrations spread out either in pounds or fractions thereof or transposed into degrees of temperature corresponding thereto along a scale incorporated in a testing device. We therefore provide a spring force applying means in the present testing apparatus and also take advantage of the availability of ice blocks or cubes in the refrigerator to supply a body of ice water or an ice water bath, for receiving the thermo-sensitive portion of the element of a thermostatic switch associated with a refrigerator so as to ready the present testing apparatus for use.

Figure 2:
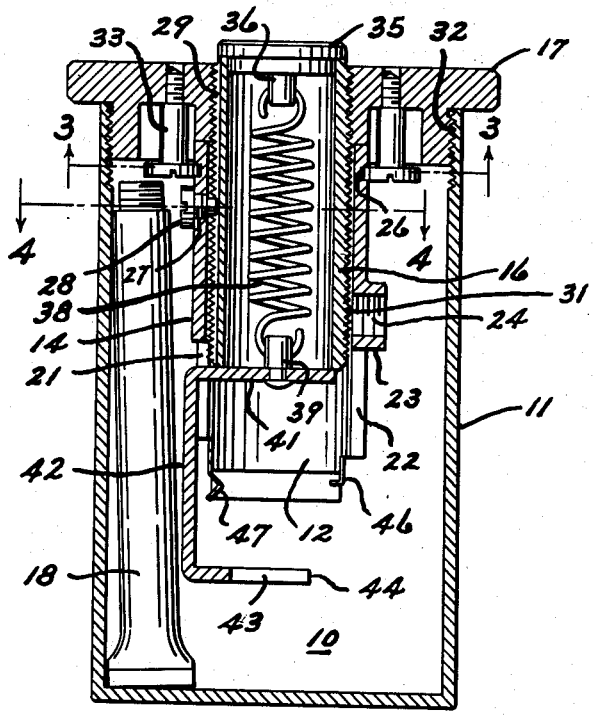
Fig. 2 is an enlarged sectional view of the apparatus taken on the line 2—2 of Fig. 1 and showing parts of one portion of the apparatus located within another portion thereof.
Figures 1, 3:
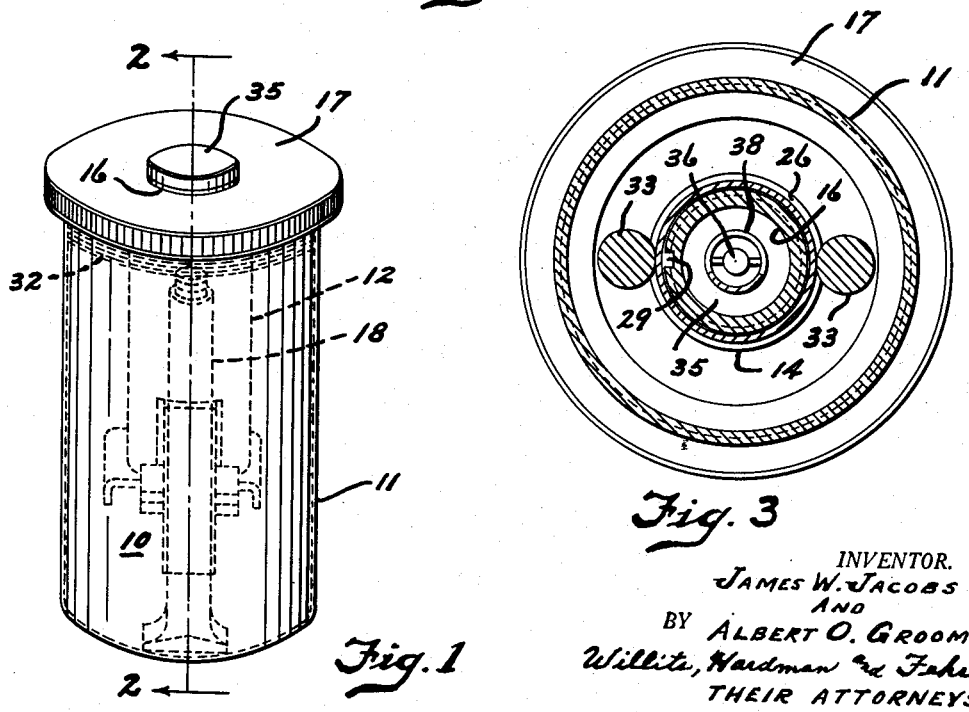
Fig. 1 shows a perspective view of the present testing apparatus with the parts thereof removably secured together.
Fig. 3 is a horizontal sectional view taken on the line 3—3 of Fig. 2.

Referring now to the drawings, for illustrating the present invention, we have shown in Fig. 1 thereof a testing apparatus comprising a unitary structure generally represented by the reference character 10. The apparatus or structure 10 includes two parts removably secured together and forming a container. The one part of the container or structure 10 is a cylindrical aluminum cup or receptacle 11 having removably threaded thereto the other part or device of the apparatus generally represented by the reference character 12. Receptacle 11 receives and conceals certain parts of device 12 and another part of device 12 forms a removable cover for the receptacle. As shown in Fig. 2 of the drawings the device part 12 of the apparatus 10 includes an aluminum tubular portion 14, which is normally stationary when operating the device, and an aluminum tubular portion 16 located within and adapted to be moved longitudinally relative to the portion 14. The device part 12 of the apparatus or structure also includes an aluminum cap 17 forming a rotatable means for the device to cause the relative longitudinal movement of the portions 14 and 16 and provides the closure or cover for the receptacle part 11 of the apparatus. A handle 18, also formed of aluminum, for the device 12 is located within the receptacle 11 and has a threaded end adapted to be attached to the stationary portion 14 of the device. Portion 14 of device 12 has an elongated opening 21 formed in its wall and is provided with an open end slot 22 in its wall across from or opposite to the opening 21 for a purpose to be hereinafter described. A boss or lug 23, on tubular portion 14, is threaded as at 24 and is adapted to receive the threaded end of handle 18. Portion 14 of device 12 also has a circular groove 26 cut in its outer wall surface adjacent one end thereof. A threaded hole 27 in portion 14 of the device 12 receives a screw 28 having a part thereof projecting into a straight line groove 29 cut in the threaded outer wall surface 31 of portion 16 of the device and extends along the length thereof. The threads 31 on portion 16 of device 12 receive a threaded central opening in the cap 17 which cap is also threaded as at 32 upon threads provided at the upper open end of receptacle 11. Screws 33 are threaded into suitable holes provided in cap 17 and have their heads projecting into or disposed in the circular groove 26 in portion 14 of the device. A button 35 loosely or slidably fitting over the one end of portion 16 of the device has a projection 36 thereon to which one end of a coil spring 38 is anchored. Button 35 is held in abutting and sliding relation with the end of device portion 16 by spring 38. The other end of spring 38 is anchored to a stud 39 mounted on one leg 41 of a substantially U-shaped metal piece 42 which has a slot 43 provided in its other leg 44. Slot 43 is adapted to receive a bellows follower of a switch so that the leg 44 of metal piece 42 may bear against the follower which abuts the movable end of a switch bellows. The spring 38 and metal piece 42 form spring means, the purpose of which will be hereinafter described. Portion 14 of device 12 has metal brackets 46 secured thereto, in any suitable or conventional manner, at one side thereof and a thin spring clip-like member 47 is secured thereto on the side thereof opposite the brackets 46. These brackets 46 and clip member 47 are adapted to receive the base of a thermostatic switch for removably clamping the same to or upon the device 12.

In Figs. 6 and 7 of the drawings we show one type of thermostatic switch 50 which may be tested, adjusted and set by a testing apparatus herein disclosed. The switch shown in Figs. 6 and 7 is fully illustrated and described in the Albert O. Grooms Patent No. 2,459,522 issued January 18, 1949, assigned to the same assignee as the present application, and therefore no detailed description of the structure and operation of switch 50 is herein necessary. This switch 50 includes a thermo-sensitive and deflectable pressure element comprising a tube 51 sealed to an expansible and contractable bellows 52 and charged with a fluid such as sulphur dioxide. Switch 50 also includes the bellows follower 53, the snap action mechanism actuated thereby and adjustable stop screws 54 and 55 corresponding to the adjustable screws described in the Grooms patent to change the stopping point of the bellows follower 53 in each direction of its travel for adjusting same so as to vary the closing and opening points of the switch contacts. Switch 50 includes electric terminals 57 and 58 cooperating with and connected to electric contacts thereof and also includes other parts or mechanisms corresponding to the similar parts illustrated and described in the Grooms patent herein identified.

In Fig. 5 of the drawings we show the device 12 of the present apparatus removed from the receptacle part 11 of container 10 and rotated to a vertical position opposite that shown in Fig. 2. In Fig. 5 we show the handle 18 removed from the receptacle 11 and threaded into the boss or lug 33 and also show a thermostatic switch 50 removably clamped upon the device 12 between the brackets 46 and spring clip 47. We also show the U-shaped piece 42 having its leg 44 straddling the bellows follower 53, which contacts the bellows 52, of switch 50 and readied to render spring 38 capable of applying force to the bellows. The U-shaped piece 42 is free to move up and down within the opening 21 in the wall of portion 14 of the device. The tube 51 is located in and passes through the open end slot 22 provided in the wall of device portion 14.

In Fig. 8 of the drawings we show an enlarged view of a part of the portion 16 of device 12 with a scale 56 stamped or etched in the bottom wall surface of groove 29. The flat end surface of cap 17 registers with the scale 56 and together therewith forms a means of indicating the force applied to the pressure element or bellows 52 of switch 50. This scale instead of being graduated in pounds pressure is graduated in degrees temperature substantially corresponding thereto so as to simplify reading of same when the flat surface of cap 17 is brought into registration with any one of the plurality of graduations on the scale.

In Fig. 9 of the drawings we show the device part 12 of container 10 in a position to be manipulated by a serviceman. Device 12 has the switch 50 clamped thereto and has the tube 51, of the thermo-sensitive and adjustable pressure element of the switch, disposed in a bath or body of ice water, containing blocks or cubes of ice or crushed ice, and located in receptacle 11. This body of refrigerating liquid or water is maintained substantially constant at 32° F. by the ice therein. As before stated, the ice for providing the ice water bath in receptacle 11 is obtained from trays located in the evaporator of the refrigerating system associated with the refrigerator cabinet.

The apparatus is used in the following manner: After placing water and ice in the receptacle 11 and permitting the body of water to reach its low temperature of 32° F. the serviceman will grasp the handle 18 of device 12, while keeping at least the end portion of tube 51 in the ice water, and will rotate cap 17 relative to the one portion 14 of the device. The head part of screws 33 rotates about the portion 14 within the groove 26 to prevent longitudinal movement of cap 17 relative to the portion 14 of the device while the cap causes longitudinal movement of portion 16 of device 12 by rotation thereof upon the threads 31. By properly manipulating device 12 the spring 38 is rendered effective to apply a force to the bellows 52, through metal piece 42 and bellows follower 53, to provide the equivalent of changing the temperature of the tube 51 to a lower temperature or cut-out point of say, for example, 12° F. for the switch. The adjusting screw 54 is adjusted by a screw-driver or the like, if necessary, to change the stopping point of the bellows follower 53 in the closed position to vary the opening point of the switch mechanism. Further manipulation of device 12 by rotating the cap 17 on the threads 31 in the opposite direction causes the portion 16 thereof to move longitudinally relative to the portion 14. The spring 38 thereby applies less force to the bellows 52 of switch 50 to provide the equivalent of changing the temperature of tube 51 to a higher temperature or cut-in point of say, for example, 28° F. of the switch. The adjusting screw 55 is adjusted by a screw driver, if necessary, to change the stopping point of the bellows follower 53 in the open position of the switch mechanism so as to vary the closing point of the switch. The closure cap 17 may be rotated to run or reciprocate the portion 16 and consequently scale 56 of device 12 back and forth over the points of setting specified, and illustrated in Fig. 8 by the dot-dash lines which represent the positions of the flat surface of cap 17 cooperating with the scale 56, in order to vary and indicate the force applied by spring 38 to bellows 52 so as to recheck and set accurately the cut-in and cut-out temperature points of the switch mechanism. The pressures for the cut-in and cut-out points may be determined in the following manner: From a pressure temperature chart of a volatile liquid used in the switch control, tube 51 and bellows 52, the pressure generated at the water bath or well temperature such as 32° F. is determined. For example, sulphur dioxide at 32° F. has a pressure of about 8 pounds per square inch gauge. Then from the same chart, the pressure of sulphur dioxide at the cut-out temperature is determined. If the cut-out temperature is 12° F., as in the present example, sulphur dioxide reaches this temperature at 1.18 inches of vacuum or about .58 pounds per square inch vacuum. In order to secure the equivalent of this pressure, when the tube 51 is disposed in the ice water bath at 32° F., it is necessary to cause the spring 38 to exert a force on bellows 52 to compensate for the difference between the pressure at the bath or well temperature of 32° F. and the force of spring 38 at the desired cut-out temperature of 12° F. This difference therefore, since the cut-out point is a vacuum, would be 8 plus .58 or 8.58 pounds per square inch approximately. These pressures are for a barometer of 29.92 inches. The pressure multiplied by the effective area of the bellows will give the required spring force such, for example, as 8.58 pounds per square in pressure multiplied by an effective bellows area of .31 square inch will give a required spring force of 2.66 pounds. For different refrigerants in the thermostat of the switch or for different barometer readings other scales, in addition to scale 56, of different calibrations may be incorporated in the device.

From the foregoing it should be apparent that we have provided a unitary container-like apparatus of light weight one part of which is separable from the other part thereof for use therewith in a testing operation. The apparatus is accurate and permits the checking and setting of temperature responsive thermostatically operated switches by a serviceman in the field to thus eliminate the necessity of his returning a switch to the service station or factory for such checking and testing. The apparatus is of low manufacturing cost and the supplying of one of such apparatuses to servicemen will greatly offset the expense and inconvenience of requiring a serviceman to return a switch to a service station for adjustment.

While the form of embodiment of the invention as herein disclosed constitutes a preferred form, it is to be understood that other forms might be adopted, as may come within the scope of the claims which follow.

What is claimed is as follows:

1. A portable apparatus for testing a thermostatically actuated switch having an operating mechanism, means for adjusting said mechanism, and a sealed fluid containing temperature responsive unit including an expansible and contractable pressure element having one end thereof stationarily mounted on a part of the switch with its other end movable for actuating said mechanism and a tube extending from one of its ends adapted to be cooled while the switch is being tested comprising; a first portion provided with means removably receiving the switch and rigidly clamping the stationarily mounted end of its pressure element against movement relative thereto, a second portion movable into and out of said first portion, a force applying means having its one end connected to said movable portion of said apparatus and having its other end secured to a member fitted over the movable end of said switch pressure element for contracting the same to actuate the switch mechanism during the testing operation, means for moving said second portion of said apparatus longitudinally relative to said first portion thereof to vary the force applied by said force applying means to said switch element, and means rendered effective by movement of said portions of said apparatus relative to one another for indicating the temperature at which said switch operating mechanism adjusting means is set.

2. A portable apparatus for testing a thermostatically actuated switch having an operating mechanism, means for adjusting said mechanism, and a sealed fluid containing temperature responsive unit including an expansible and contractable pressure element having one end thereof stationarily mounted on a part of the switch with its other end movable for actuating said mechanism and a tube extending from one of its ends adapted to be cooled while the switch is being tested comprising; a first portion provided with means removably receiving the switch and rigidly clamping the stationarily mounted end of its pressure element against movement relative thereto, a second portion movable into and out of said first portion, a force applying means having its one end connected to said movable portion of said apparatus and having its other end secured to a member fitted over the movable end of said switch pressure element for contracting the same to actuate the switch mechanism during the testing operation, means for moving said second portion of said apparatus longitudinally relative to said first portion thereof to vary the force applied by said force applying means to said switch element, means on said movable portion of said apparatus normally concealed within said first portion thereof, and said last named means being exposed when said movable portion of said apparatus is moved outwardly of said first portion thereof and registering with said movable means to indicate the temperature at which said switch operating mechanism adjusting means is set.

3. A portable apparatus for testing a thermostatically actuated switch having an operating mechnism, means for adjusting said mechanism, and a sealed fluid containing temperature responsive unit including an expansible and contractable pressure element having one end thereof stationarily mounted on a part of the switch with its other end movable for actuating said mechanism and a tube extending from one of its ends adapted to be cooled while the switch is being tested comprising; a first portion provided with means removably receiving the switch and rigidly clamping the stationarily mounted end of its pressure element against movement relative thereto, a second portion movable into and out of said first portion, a spring having its one end connected to said movable portion of said apparatus and having its other end secured to a member fitted over the movable end of said switch pressure element for contracting the same to actuate the switch mechanism during the testing operation, means carried by and rotatable relative to said first portion of said apparatus for moving said second portion thereof out of and into said first portion to vary the force applied by said spring to said switch element, and means rendered effective by movement of said second portion of said apparatus out of said first portion thereof by said rotatable means for indicating the temperature at which said switch operating mechanism adjusting means is set.

4. A portable apparatus for testing a thermostatically actuated switch having an operating mechanism, means for adjusting said mechanism, and a sealed fluid containing temperature responsive unit including an expansible and contractable pressure element having one end thereof stationarily mounted on a part of the switch with its other end movable for actuating said mechanism and a tube extending from one of its ends adapted to be cooled while the switch is being tested comprising; a first portion provided with means removably receiving the switch and rigidly clamping the stationarily mounted end of its pressure element against movement relative thereto, a second portion movable into and out of said first portion, a spring having its one end connected to said movable portion of said apparatus and having its other end secured to a member fitted over the movable end of said switch pressure element for contracting the same to actuate the switch mechanism during the testing operation, means carried by and rotatable relative to said first portion of said apparatus for moving said second portion thereof out of and into said first portion to vary the force applied by said spring to said switch element, means on said movable portion of said apparatus normally concealed within said first portion thereof, and said last named means being exposed when said movable portion of said apparatus is moved out of said first portion thereof and registering with said movable means to indicate the temperature at which said switch operating mechanism adjusting means is set.

JAMES W. JACOBS.
ALBERT O. GROOMS.

References Cited in the file of this patent
UNITED STATES PATENTS

| Number | Name | Date |
| --- | --- | --- |
| 1,694,164 | Crosthwait | Dec. 4, 1928 |
| 2,291,561 | Reiss | July 28, 1942 |
| 2,306,740 | Middleman | Dec. 29, 1942 |
| 2,357,353 | Pearce | Sept. 5, 1944 |
| 2,534,123 | Hasselhorn | Dec. 12, 1950 |
| 2,541,385 | Rothwell | Feb. 13, 1951 |